United States Patent Office 3,341,474

Patented Sept. 12, 1967

3,341,474

BORAZENE OXIDE DERIVATIVE POLYMERS AND PREPARATION THEREOF

James L. Bradford, Anaheim, and Ross I. Wagner, Whittier, Calif., assignors to American Potash & Chemical Corporation, Los Angeles, Calif., a corporation of Delaware No Drawing. Filed Dec. 1, 1961, Ser. No. 156,521
13 Claims. (Cl. 260—2)

This invention relates in general to novel borazene oxide derivatives and novel methods of preparing these derivatives. More specifically, this invention relates to borazene oxide derivatives wherein borazene rings are joined together through an oxygen atom.

The desirable properties, particularly the neutron absorption and thermal stability of borazene compounds have long been known. Inorganic polymers prepared from borazene compounds have long been sought because of these valuable properties. However, no acceptable polymer or method for preparing such a polymer has heretofore been available. In particular, no inorganic polymers based upon borazene have been available in which the degree of polymerization could be regulated as desired. Further, no process has been available whereby polymeric borazene derivatives could be prepared either as linear or cross-linked chains of rings as desired.

Broadly, the borazene oxide derivatives according to this invention, provide at least two borazene rings joined to one another through an oxygen atom linkage.

More specifically, borazene oxide derivatives of this invention provide borazene rings joined together through an oxygen atom. The oxygen atom forms a bridge between boron atoms in separate rings. Any number of borazene rings can be joined to one another in this manner. The character of the product is determined by the selection of starting materials. Thus, if monofunctional borazene derivativas are used to prepare the borazene oxide derivatives of this invention, only two borazene rings will be joined. If difunctional borazene derivatives are chosen as the starting materials linear borazene oxide derivatives will be formed. The use of tri-functional borazene derivatives results in the preparation of a cross-linked borazene oxide derivative.

The borazene derivative starting materials can be prepared according to the general procedures described in common assignees copending application Ser. No. 156,534 filed Dec. 1, 1961, now abandoned. While this copending application specifically describes the preparation of mono- and difunctional derivatives, the techniques described therein are generally applicable to the preparation of trifunctional derivatives.

The borazene oxide derivatives of this invention range from crystalline solids to liquids or glasses in their normal state under ambient conditions. The polymeric derivatives can be either thermoplastic or thermosetting materials. The polymers and compounds are used, for example, as components in flame resistant compositions, plasticizers, fuel additives, neutron absorbers, molding composition extenders, laminating resins, high temperature insulation, heat transfer mediums, films, filaments, molded articles, etc.

Borazene oxide derivatives according to this invention have the formula:

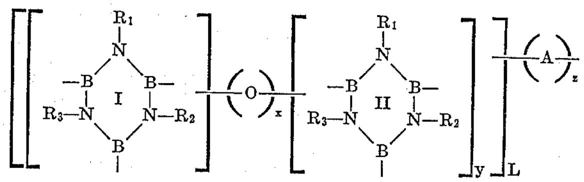

In this formula $n$, $y$ and L are integers chosen so that L $(n+y)$ is at least 2 and can be 3000 or more; $x$ is an integer equal to at least 1; and $z$ is an integer which is equal to the number of open valences on the annular boron atoms in borazene derivatives I and II after all of the borazene oxide linkages have been formed. The borazene oxide linkage has the structure

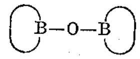

wherein the annular boron atoms are located in separate borazene rings. Obviously, $x$ is so chosen that it is equal to the number of such linkages which are to be formed.

The preferred borazene oxide derivatives of this invention are polymers, so that in the above formula our preferred derivatives are those in which L $(n+y)$ is at least 3 and can be up to about 300; $x$ is from 2 to about 450 and $z$ is from 4 to about 300.

In the borazene oxide derivatives of this invention all of the $\text{-(O)-}$, as shown in the above formula, are bonded to 2 annular boron atoms which annular atoms are in separate rings.

The substituents $R_1$, $R_2$ and $R_3$ can be any of hydrogen, alkyl, alicyclic or arene substituents. $R_1$, $R_2$ and $R_3$ can be the same or different on any particular borazene ring and can be the same or different from one borazene ring to another in a given borazene oxide derivative. Each R substituent is independently selected for each position on each borazene ring.

The substituent A can be any hydroxy, alkyl, alicyclic or arene substituents. Each A is independently selected for each position on each borazene ring. The A substituents on a given borazene oxide derivative can all be the same or they can all be different.

Broadly, in accordance with the present invention, it has been determined that borazene oxide derivatives can be prepared by the hydrolysis of certain borazene compounds. The process is applicable to the production of non-polymeric, cyclic polymeric, linear polymeric and cross-linked polymeric borazene oxide derivatives.

More specifically, the process of the present invention comprises co-hydrolyzing haloborazene derivatives having the formulas:

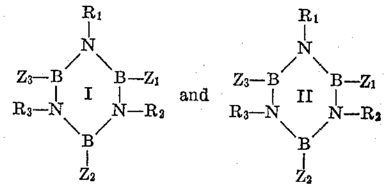

In the above formula $R_1$, $R_2$ and $R_3$ have the same meaning as above. The substituents $Z_1$, $Z_2$ and $Z_3$ can be any of halogen, alkyl, alicyclic or arene substituents, provided at least one of these substituents is halogen on each of I and II. Hydrolysis is accomplished by exposing the haloborazene derivatives to water. Preferably the water is provided in stoichiometric amount with the haloborazene. If excess water is present undesired hydrolysis of the borazene ring will take place to a certain extent.

The character of the polymeric materials of this invention can be controlled by adjusting the ratio of trifunctional reactants to difunctional reactants. In general, the greater the proportion of trifunctional reactants the harder and more infusible the polymer. If the proportion of difunctional reactants is increased the polymer becomes more thermoplastic and flexible.

The molecular weight can be controlled within limits by the addition of monofunctional reactants to a mixture of di- and tri-functional reactants. The greater the proportion of monofunctional material the lower the average molecular weight. End-blocking of the polymer can be accomplished in many ways such as cyclization, reaction with impurities, formation of hydroxyl groups or reaction with monofunctional reactants.

Preferably some chemical reactant will be supplied in the reaction mixture to combine with and remove the evolved halogen atom. It is desirable to remove the halogen atom since the reaction proceeds best when a substantially neutral reaction medium is maintained. The reaction will, however, take place if the evolved halogen is not removed from the reaction medium, so the use of some reagent for this purpose is not essential to the reaction. Generally, any organic or inorganic base can be used to remove the halogen from the reaction medium. Bases which have been found particularly useful include sodium hydroxide and other inorganic hydroxides, pyridine, dimethylaniline and other tertiary amines.

The nature of the reaction medium is not critical. However, since the reaction product and the haloborazene derivatives are normally solids, the reaction becomes very difficult to carry out if no solvent is employed. This is so because it becomes difficult to mix the reactants when a large amount of solid phase is present in the reaction mixture.

A large number of solvents can be used in the process of this invention including: aliphatic ethers such as diamyl ether, diheptyl ether, isobutyl neopentyl ether, diisopropyl ether, dimethyl ether, diethyl ether, dipropyl ether, butyl ethyl ether, hexyl methyl ether, arene ethers such as anisole, phenetole, diphenyl ether, veratrole, benzyl phenyl ether, dinaphthyl ether; cyclic ethers, such as tetrahydrofuran, dioxane, tetrahydropyran; arene or aliphatic hydrocarbons, such as diisoamyl (2,7-dimethyloctane), hexane, n-hexadecane, cyclohexane, iso-octane, cyclopentane, trimethylpentane, 2-methylpentane, isopentane, methylcyclohexane, benzene, octadecylcyclohexane, naphthalene, toluene, p-xylene, naphtha, butylbenzene, ethylbenzene, cumene, octadecylbenzene, etc.; halogenated solvents, such as carbon tetrachloride, chloroform, 1-chloro-4-fluorobenzene, 1 - chlorohexane, 2,1 - chloroiodoethane, chloromethyl ether, 2-chloro-2-methylbutane, chloroethane, 1-chlorodecane, fluorobenzene, 1-fluorooctane, bromoethane, 1-bromo-4-fluorobenzene, bromoform, and 1-bromonaphthalene, etc. Mixture of solvents can be used if desired.

Cooling and heating steps can be provided in the process as desired. The temperature at which the hydrolysis reaction of this invention takes place is not critical. The effect of varying the reaction temperature is a corresponding increase or decrease in the rate of reaction. Since the reaction is almost instantaneous at room temperature, it is often desirable to operate at about this temperature since this eliminates the problem of special equipment to contain and maintain either hot or cold reactants. In general, it is convenient to adjust the temperature of reaction to be between about the boiling point and freezing point of the reactants.

Generally, the operable temperature range is between about −50° C. and about 100° C. with the preferred range being from about 0° C. to about 50° C. Above 50° C. the yield is reduced due to partial hydrolysis of the borazene to boric or various boronic acids and to ammonia or various amines. Below 0° C. the reactants are generally solids but special solutions can be prepared, such as water in triethylamine, which will allow the reaction to proceed at lower temperature.

The reaction can be conducted at atmospheric, subatmospheric or super-atmospheric pressure as desired without any substantial effect on the course of the reaction.

Generally, the borazene oxide derivatives are recovered from the reaction as insoluble precipitates in the reaction mixture. Some derivatives, however, are recovered as solutions. Conventional techniques for the separation of precipitates from reaction mixtures are well understood by the art and can be used to recover these materials. Such techniques include centrifuging, settling and filtering. Soluable products can be revovered by conventional techniques such as evaporation.

If the borazene oxide derivatives are recovered as a solution in the reaction medium they can be isolated by conventional well understood processes such as evaporation of the reaction medium.

Haloborazene derivatives can be prepared by heating hydrogen halide in contact with borazene compounds that have at least one hydrogen on an annular boron atom.

In the specification, claims and following examples all parts and percentages are by weight unless otherwise specified. The following examples are submitted to illustrate and not to limit this invention.

*Example 1*

A 15 ml. centrifuge cone is fitted with a rubber septum and filled with nitrogen. A solution of 0.3931 g. (2.12 mmoles) of pentamethyl-B-chloroborazene in 3 ml. of diethyl ether is added to the cone. An ethereal solution of distilled water is prepared by mixing 0.25 ml. of distilled water with 10 ml. of diethyl ether. An estimated 0.39–0.44 mmoles of distilled water is added to the cone by introducing 0.77 ml. of this ether-water solution while agitating the cone. A white milky precipitate is formed immediately. The temperature of the reaction mixture is about 25° C. The addition of 0.2145 g. (2.12 mmoles) of triethylamine results in the evolution of heat and precipitation of 0.1826 g. of crude triethylammonium chloride. The triethylammonium chloride is removed by filtration. The ethereal filtrate is evaporated to leave a solid residue which is sublimed at 50° C. to recover 0.1630 g. (0.881 mmole, 41.5%) of the starting material, pentamethyl-B-chloroborazene. Further sublimation at 100° C. yields 0.0791 g. of solid and 0.0124 g. of glassy residue. This 0.0791 g. sublimate is recrystallized from iso-propylamine and then resublimed to produce a product having a melting point range of 125–129° C. This product shows an infrared absorption at 10.52$\mu$ which is due to the presence of B—O—B linkage. The calculated values for $C_{10}H_{30}B_6N_6O$ are: C, 38.09; H, 9.59; M.W. 315.3. The analytically determined values for the product are: C, 37.75; H, 9.61; M.W. 313.0. The product can be recrystallized from either iso-propylamine or methylamine. The compound is identified as decamethyl-B,B′-diborazyl oxide.

*Example 2*

A 100 ml. septum bottle equipped with a magnetic stirring bar is filled with nitrogen. An ethereal solution of 2.2805 g. (11.10 mmoles) of tetramethyl-B-dichloroborazene in 50 ml. of diethyl ether is prepared. A 0.200 ml. (11.11 mmoles) quantity of distilled water is slowly syringed into this constantly stirred solution. The temperature of the reaction mixture is about 25° C. A voluminous white precipitate is produced. Further precipitation is caused by the introduction of 2.2774 g. (22.51 mmoles) of triethylamine and also considerable heat is evolved. The solution is continually stirred for one hour after the introduction of the amine. The solids are removed from this solution by filtration. The solids are washed with two 10 ml. portions of diethyl ether and vacuum dried to give 2.6060 g. (18.93 mmoles, 86.7% based on the original triethylamine) of tan amphorous powder characterized by infrared and elemental analyses as predominately triethylammonium chloride. The filtrate is evaporated and the glassy residue is subjected to vacuum sublimation at 150° C. Only a trace of material volatilizes from the residue at this temperature. The residual light brown glassy polymeric product weighs 1.0790 g. This material melts over the temperature range 180–200° C. and possesses the characteristic B—O—B infrared absorption (10.52$\mu$). The theoretical analysis of poly(1,3,5,6-tetramethyl-2,4-borazylene oxide), $(C_4H_{12}N_3B_3O)_n$, is as follows: C, 31.89; H, 8.03; molecular weight, $(150.6)_n$. Analysis of this compound gives C, 29.17; H, 8.13; molecular weight, 3512 (degree of polymerization, $n$, 23.2). This product is identified as poly(1,3,5,6-tetramethyl-2,4-borazylene oxide). This represents a 64.7% yield or 7.164 mmoles calculated as the monomer.

*Example 3*

Co-hydrolysis in 15 ml. of diethyl ether of a mixture of 1.1146 g. (6.021 mmoles) of pentamethyl-B-chloroborazene and 0.6186 g. (3.010 mmoles) of tetramethyl-B-dichloroborazene with the stoichiometric quantity of aqueous triethylamine yields on sublimation the following fractions:

(1) 0.2102 g. (0.6667 mmole) or 22.1% of the pentamethyl-B-chloroborazene as decamethyl-B,B'-diborazyl oxide (obtained at 100° C.) having a melting point range of 125–131° C.

(2) 0.2051 g. of a colorless sticky sublimate (obtained at 140° C.) having a melting point range of 133–155° C., molecular weight 478.6 identified as

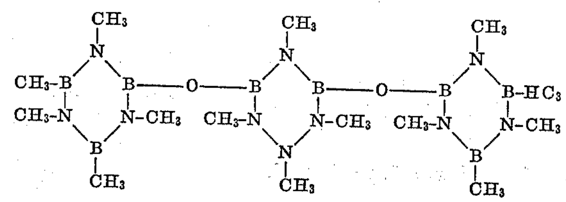

(3) 0.4460 g. of a brittle yellow glassy residue of molecular weight 734.5, identified as

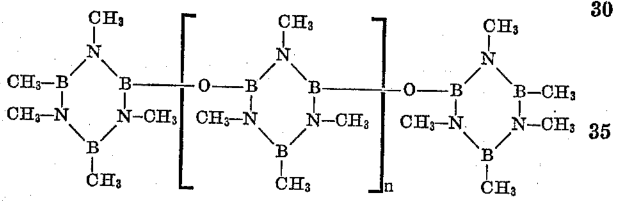

wherein $n$ is 3.

The procedures of Example 1 are followed in the reaction of pentamethyl-B-fluoroborazene to produce decamethyl-B,B'-diborazyl oxide.

Decamethyl-B,B'-diborazyl oxide is produced according to the procedure of Example 1, using pentamethyl-B-iodoborazene.

The procedures of Example 1 are repeated using dioctyl ether as the solvent and dimethylaniline as the base to remove the hydrogen chloride. The reaction is conducted at 100° C. A low yield of decamethyl-B,B'-diborazyl oxide is obtained.

The procedures of Example 1 are followed in the reaction of N-triphenyl-B-dimethyl-B-chloroborazene to produce N-triphenyl-N'-triphenyl-B-dimethyl-B'-dimethyl-B,B'-diborazyl oxide.

The product N-tricyclohexyl-N'-tricyclohexyl-B-dimethyl-B'-dimethyl-B,B'-diborazyl oxide is produced by the reaction of N-tricyclohexyl-B-dimethyl-B-chloroborazene according to the procedures of Example 1.

The procedures of Example 1 are followed to produce N-tridodecyl-N'-tridodecyl-B-dimethyl-B'-dimethyl-B,B'-diborazyl oxide by the reaction of N-tridodecyl-B-dimethyl-B-chloroborazene.

A hard infusable polymer is produced by the reaction of N-tripropyl-B-triiodoborazene with N-tricyclopentyl-B-triiodoborazene in a solution of hexane according to the procedures of Example 1.

The polymeric reaction product poly(1,3,5,6-tetramethyl-2,4-borazylene oxide) is produced by the reaction of tetramethyl-B-dibromoborazene according to the procedures of Example 2. The polymeric product is terminated with hydroxy groups.

A tough infusable polymer is produced by the reaction of N-trimethyl-B-trichloroborazene according to the procedures of Example 2.

The polymeric product poly(1,3,5-trimethyl-6-biphenyl-2,4-borazylene oxide) is produced by the reaction of N-trimethyl-B-biphenylyl-B-dichloroborazene, following the procedures of Example 2.

The procedures of Example 2 are followed in the reaction of N-dimethyl-N-propyl-B-cyclopentyl-B-dichloroborazene to produce poly(1,3-dimethyl-5-propyl-6-cyclopentyl-2,4-borazylene oxide).

A linear polymer containing at random the divalent radicals N-trimethyl-B-phenylborazylene and N-trimethyl-B-cyclohexylborazylene joined to one another at the boron atoms through oxygen atoms is produced by the reaction of N-trimethyl-B-phenyl-B-dichloroborazene with N-trimethyl-B-cyclohexyl-B-dichloroborazene following the procedures of Example 2.

The procedures of Example 3 are followed in the reaction of N-trimethyl-B-tribromoborazene with pentamethyl-B-iodoborazene in a molar ratio of one to three to produce a mixture of products including decamethyl-B,B'-diborazyl oxide, the compound having the formula:

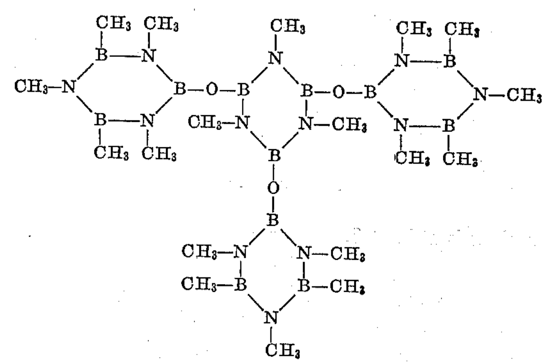

and higher polymers. Sodium hydroxide is used as the base to neutralize the evolved hydrogen bromide and hydrogen iodide.

The procedures of Example 3 are followed in the reaction of N-trimethyl-B-tribromoborazene with pentamethyl-B-iodoborazene to produce a highly cross-linked polymer. The reactants N-trimethyl-B-tribromoborazene and pentamethyl-B-iodoborazene are reacted in a molar ratio of four to one.

The reaction, according to the procedures of Example 3, of N-trimethyl-B-trichloroborazene with tetramethyl-B-dichloroborazene in a molar ratio of five to one produces a highly cross-linked polymer.

The R substituents $R_1$, $R_2$ and $R_3$ described above as being attached to the annular nitrogen atoms can be selected from any of the following illustrative but not all inclusive lists of substituents: alkyl substituents such as ethyl, methyl, iso-amyl, neopentyl, decyl, hexyl, propyl, 2-methylpentyl, 5-methylhexyl, pentyl, dodecyl, butyl; alicyclic substituents such as cyclopentyl, cyclohexyl, cyclopropyl, cycloheptyl, p-methylcyclohexyl, 3-butylcyclopentyl, 3,5-diethylcyclohexyl, cyclobutyl; arene substituents such as 2,4-xylyl, m-cumenyl, phenyl, 2-methoxyphenyl, mesityl, biphenyl, naphthyl, indanyl, tolyl, etc.

The alkyl, alicyclic and arene substituents of this invention preferably have between 1 and 12 carbon atoms. Substituents having more than 12 carbon atoms tend to cause such steric hindrance that reactions become difficult to carry out.

The substituents $Z_1$, $Z_2$ and $Z_3$ can be the same as the R substituents described above and in addition they can be any halogen atom including fluorine, chlorine, bromine and iodine. At least one of $Z_1$, $Z_2$ and $Z_3$ on each borazene ring will be a halogen atom. Preferably, when Z is a halogen it is chlorine, bromine or iodine since these compounds are easier to work with than the fluorine compounds.

The substituent A, described above as being attached to all those annular boron atoms which are not attached to an oxygen atom can be any of hydroxy or those R substituents described above.

The compounds set forth below are illustrative of the borazene oxide derivatives of this invention but not all inclusive thereof. In the following formulas the borazene ring has been represented thusly, with only the open valences on the annular boron

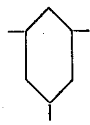

atoms being shown. It will be understood that the annular nitrogen atoms will also carry substituents but for the sake of simplicity these substituents are not shown. The substituent A is defined as above. Adjacent to the following structures numerical values of *n*, *x*, *y*, *z* and L are given as defined in the general formula for this class of borazene oxide derivatives and presented earlier in the broad definition of the present invention.

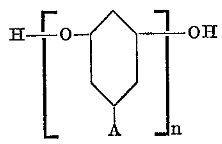

wherein *n* is at least 2.

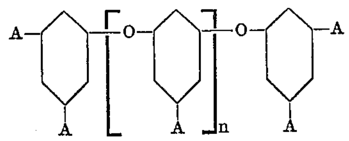

wherein *n* can be O.

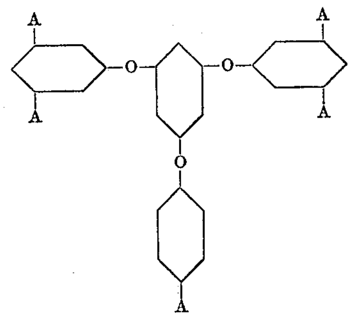

$L=1$, $n=1$, $x=3$, $y=3$, $z=5$.

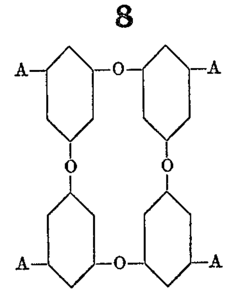

$L=1$, $n=2$, $x=4$, $y=2$, $z=4$.

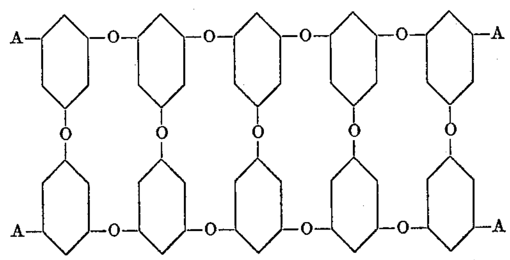

$L=1$, $n=6$, $x=13$, $y=4$, $z=4$.

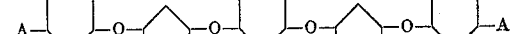

$L=1$, $n=2$, $x=4$, $y=9$, $z=9$.

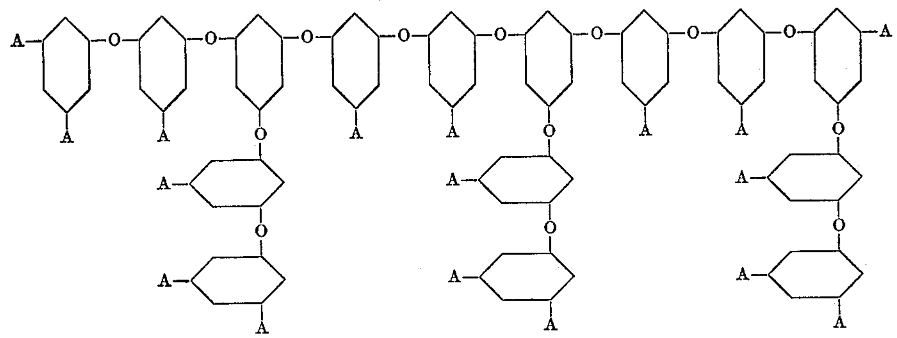

$L=3$, $n=2$, $x=5$, $y=3$, $z=17$.

As will be understood by those skilled in the art various specific compounds of this invention can be composed of random combinations of the above structures.

Specific examples of the haloborazene derivatives employed in the processes of this invention include but are not limited to the following: N-cyclohexyl-B-dihexyl-B-chloroborazene, B-cyclohexyl-B-difluoroborazene, B-methyl-B-ethyl-B-chloroborazene, B-dimethyl-B-fluoroborazene, B-dineopentyl-B-chloroborazene, B-dipropyl-B-bromoborazene, B-octyl-B-diiodoborazene, B-cyclopentyl-B-dibromoborazene, B-diphenyl-B-iodoborazene, B-biphenyl-B-dichloroborazene, B-dodecyl-B-dichloroborazene, B-ethyl-B-difluoroborazene, B-methyl-B-cyclopentyl-B-chloroborazene, B-isopropyl-B-phenyl-B-bromoborazene, B-cyclohexyl-B-tolyl-B-iodoborazene, N-trimethyl-B-ethyl-B-chloroborazene, N-ethyl-B-ethyl-B-dibromoborazene, N-phenyl-B-diphenyl-B-iodoborazene, N-dicyclohexyl-B-cyclohexyl-B-difluoroborazene, N-triphenyl-B-methyl-B-diiodoborazene, N-methyl-N-ethyl-N-propyl-B-butyl-B-pentyl-B-chloroborazene, B-trichloroborazene, N-trimethyl-B-tribromoborazene and N-dimethyl-B-triiodoborazene.

As will be understood by those skilled in the art, what has been described is the preferred embodiment of the invention, however, many modifications, changes and substitutions can be made therein without departing from the scope and the spirit of the following claims.

We claim:

1. A borazene oxide derivative having the formula:

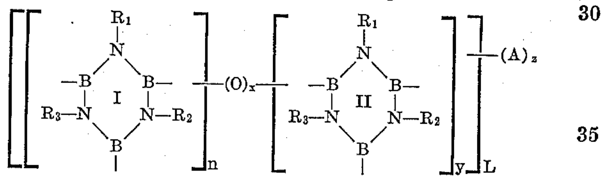

wherein:
Formulas I and II represent a separate borazene derivative;
$n$, $y$, and L are integers chosen so that $L(n+y)$ is at least 2;
$x$ is the total number of single oxygen linkages between borazene rings I and II and is an integer equal to at least 1;
$z$ is an integer which is at least 4 and is equal to the number of annular boron atoms of said formula which are not attached to one another through a single oxygen atom;
$R_1$, $R_2$, and $R_3$ are each independently selected from the group consisting of hydrogen, alkyl, alicyclic and arene substituent, said substituent containing no more than 12 carbon atoms each; and
A is independently selected from the group consisting of hydroxy, alkyl, alicyclic and arene substituent, said substituent containing no more than 12 carbon atoms each.

2. A borazene oxide derivative having the formula:

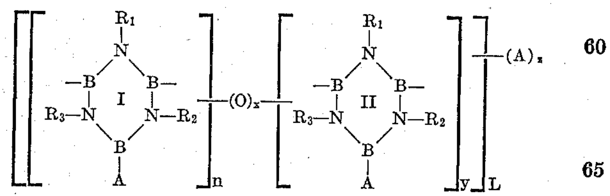

wherein:
Formulas I and II represent a separate borazene derivative;
$n$, $y$, and L are integers chosen so that $L(n+y)$ is at least 2;
$x$ is the total number of single oxygen linkages between borazene rings I and II and is an integer equal to at least 1;
$z$ is an integer which is at least 4 and is equal to the number of annular boron atoms of said formula which are not attached to one another through a single oxygen atom;
$R_1$, $R_2$, and $R_3$ are each independently selected from the group consisting of hydrogen, alkyl, alicyclic and arene substituent, said substituent containing no more than 12 carbon atoms each; and
A is independently selected from the group consisting of hydroxy, alkyl, alicyclic and arene substituent, said substituent containing no more than 12 carbon atoms each.

3. A borazene oxide derivative having the formula:

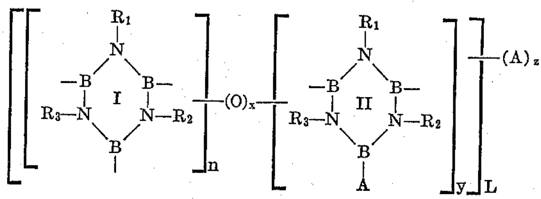

wherein:
Formulas I and II represent a separate borazene derivative;
$n$, $y$, and L are integers chosen so that $L(n+y)$ is at least 2;
$x$ is the total number of single oxygen linkages between borazene rings I and II and is an integer equal to at least 1;
$z$ is an integer which is at least 4 and is equal to the number of annular boron atoms of said formula which are not attached to one another through a single oxygen atom;
$R_1$, $R_2$, and $R_3$ are each independently selected from the group consisting of hydrogen, alkyl, alicyclic and arene substituent, said substituent containing no more than 12 carbon atoms each; and
A is independently selected from the group consisting of hydroxy, alkyl, alicyclic and arene substituent, said substituent containing no more than 12 carbon atoms each.

4. A borazene oxide derivative having the formula:

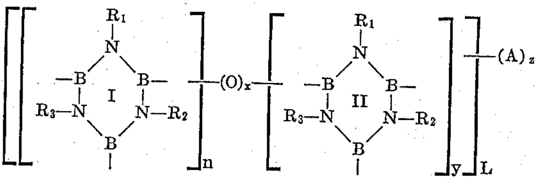

wherein:
Formulas I and II represent a separate borazene derivative;
$n$, $y$ and L are integers chosen so that $L(n+y)$ is equal to from 3 to about 300;
$x$ is the total number of single oxygen linkages between borazene rings I and II and is an integer equal to from 2 to about 450;
$z$ is an integer which is at least 4 and is equal to the number of annular boron atoms of said formula which are not attached to one another through a single oxygen atom;
$R_1$, $R_2$, and $R_3$ are each independently selected from the group consisting of hydrogen, alkyl, alicyclic and arene substituent, said substituent containing no more than 12 carbon atoms each; and
A is independently selected from the group consisting of hydroxy, alkyl, alicyclic and arene substituent, said substituent containing no more than 12 carbon atoms each.

5. Poly(1,3,5,6-tetramethyl-2,4-borazylene oxide).

6. Decamethyl-B,B'-diborazyl oxide.

7. Process for the production of a borazene oxide polymer comprising co-hydrolyzing a mixture of a haloborazene derivative having the formulas:

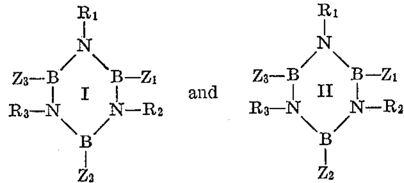

wherein;

$R_1$, $R_2$ and $R_3$ are each independently selected from the group consisting of hydrogen, alkyl, alicyclic and arene substituent, said substituents containing no more than 12 carbons atoms each;

$Z_1$, $Z_2$ and $Z_3$ are each independently selected from the group consisting of halogen, alkyl, alicyclic and arene substituent, said substituents containing no more than 12 carbons atoms each;

at least one of said substituent $Z_1$, $Z_2$ and $Z_3$ in each of said Formulas I and II being halogen;

the haloborazene of said Formula I being distinct from the haloborazene of said Formula II and recovering said borazene oxide derivative.

8. Process for the production of a borazene oxide polymer comprising co-hydrolyzing a mixture of a haloborazene derivative having the formulas:

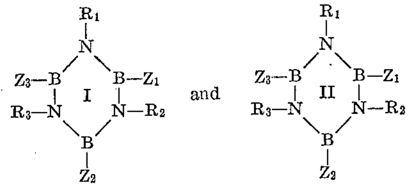

wherein;

$R_1$, $R_2$ and $R_3$ are each independently selected from the group consisting of hydrogen, alkyl, alicyclic and arene substituent, said substituents containing no more than 12 carbons atoms each;

$Z_1$, $Z_2$ and $Z_3$ are each independently selected from the group consisting of halogen, alkyl, alicyclic and arene substituent, said substituents containing no more than 12 carbon atoms each;

one of said substituents $Z_1$, $Z_2$ and $Z_3$ in each of said Formulas I and II being halogen;

the haloborazene of said Formula I being distinct from the haloborazine of said Formula II and recovering said borazene oxide derivative.

9. Process for the production of a borazene oxide polymer comprising co-hydrolyzing a mixture of a haloborazene derivative having the formulas:

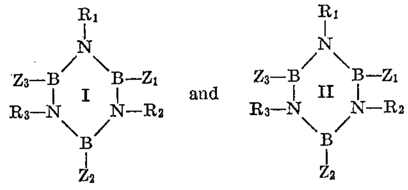

wherein;

$R_1$, $R_2$ and $R_3$ are each independently selected from the group consisting of hydrogen, alkyl, alicyclic and arene substituent, said substituents containing no more than 12 carbon atoms each;

$Z_1$, $Z_2$ and $Z_3$ are each independently selected from the group consisting of halogen, alkyl, alicyclic and arene substituent, said substituents containing no more than 12 carbon atoms each;

two of said substituents $Z_1$, $Z_2$ and $Z_3$ in each of said Formulas I and II being halogen;

the haloborazene of said Formula I being distinct from the haloborazene of said Formula II and recovering said borazene oxide derivative.

10. Process for the production of a borazene oxide polymer comprising co-hydrolyzing a mixture of a haloborazene derivative having the formulas:

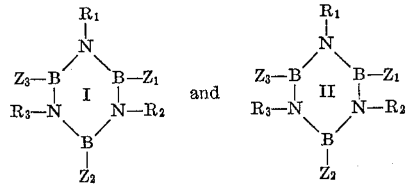

wherein;

$R_1$, $R_2$ and $R_3$ are each independently selected from the group consisting of hydrogen, alkyl, alicyclic and arene substituent, said substituents containing no more than 12 carbon atoms each;

$Z_1$, $Z_2$ and $Z_3$ being halogen;

the haloborazene of said Formula I being distinct from the haloborazene of said Formula II and recovering said borazene oxide derivative.

11. Process for the production of a borazene oxide polymer comprising co-hyrolyzing, in the presence of a base, a mixture of a haloborazene derivative having the formulas:

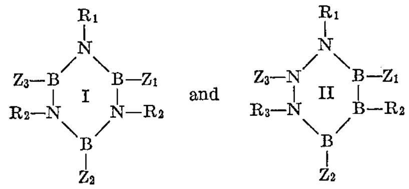

wherein;

$R_1$, $R_2$ and $R_3$ are each independently selected from the group consisting of hydrogen, alkyl, alicyclic and arene substituent, said substituents containing no more than 12 carbon atoms each;

$Z_1$, $Z_2$ and $Z_3$ are each independently selected from the group consisting of halogen, alkyl, alicyclic and arene substituent, said substituents containing no more than 12 carbon atoms each;

at least one of said substituents $Z_1$, $Z_2$ and $Z_3$ in each of said Formulas I and II being halogen;

the haloborazene of said Formula I being distinct from the haloborazene of said Formula II and recovering said borazene oxide derivative.

12. Process for the production of a borazene oxide polymer comprising co-hydrolyzing a mixture of a haloborazene derivative having the formulas:

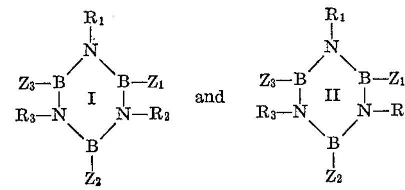

wherein;

$R_1$, $R_2$ and $R_3$ are each independently selected from the group consisting of hydrogen, alkyl, alicyclic and arene substituent, said substituents containing no more than 12 carbon atoms each;

$Z_1$, $Z_2$ and $Z_3$ are each independently selected from the group consisting of halogen, alkyl, alicyclic and arene substituent, said substituents containing no more than 12 carbon atoms each;

two of said substituents $Z_1$, $Z_2$ and $Z_3$ in said Formula I being halogen, and one of said substituents $Z_1$, $Z_2$ and $Z_3$ in said Formula II being halogen;

the haloborazene of said Formula I being distinct from the haloborazene of said Formula II and recovering said borazene oxide derivative.

13. Process for the production of a borazene oxide polymer comprising co-hydrolyzing with a stoichiometric amount of water a mixture of a haloborazene derivative having the formulas:

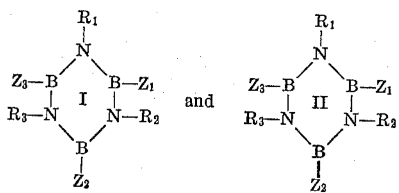

wherein;

$R_1$, $R_2$ and $R_3$ are each independently selected from the group consisting of hydrogen, alkyl, alicyclic and arene substituent, said substituents containing no more than 12 carbon atoms each;

$Z_1$, $Z_2$ and $Z_3$ are each independently selected from the group consisting of halogen, alkyl, alicyclic and arene substituent, said substituents containing no more than 12 carbon atoms each;

at least one of said substituents $Z_1$, $Z_2$ and $Z_3$ in each of said Formulas I and II being halogen;

the haloborazene of said Formula I being distinct from the haloborazene of said Formula II and recovering said borazene oxide derivative.

References Cited

Smolin et al.: "Chemistry of Heterocyclic Compounds, S-triazines and Derivatives" (1959), pp. 619–24.

Wagner et al.: Inorganic Chemistry, vol. 1, No. 1, pp. 99–106 (February 1962).

WALTER A. MODANCE, *Primary Examiner.*

IRVING MARCUS, J. W. MOLASKY, HARRY I. MOATZ, *Examiners.*